United States Patent
Um

(10) Patent No.: US 10,437,489 B2
(45) Date of Patent: Oct. 8, 2019

(54) MEMORY SYSTEM AND OPERATING METHOD THEREOF

(71) Applicant: SK hynix Inc., Gyeonggi-do (KR)

(72) Inventor: Gi-Pyo Um, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 42 days.

(21) Appl. No.: 15/399,901

(22) Filed: Jan. 6, 2017

(65) Prior Publication Data

US 2017/0322741 A1   Nov. 9, 2017

(30) Foreign Application Priority Data

May 4, 2016 (KR) .......................... 10-2016-0055475

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0659* (2013.01)

(58) Field of Classification Search
CPC ...... G06F 3/0619; G06F 3/0629; G06F 3/065; G06F 3/0659; G06F 3/067; G06F 3/0673; G06F 3/0679; G06F 3/0683; G06F 3/0688; G06F 12/0646; G06F 12/0684

USPC ........ 710/6, 74; 711/154, 162, 167, 169, 170
See application file for complete search history.

(56) References Cited

U.S. PATENT DOCUMENTS

| | | | | |
|---|---|---|---|---|
| 2012/0185733 | A1* | 7/2012 | Carman ................ | G06F 11/073 714/42 |
| 2015/0363106 | A1 | 12/2015 | Lim et al. | |
| 2016/0266825 | A1* | 9/2016 | Waseda ................ | G06F 11/073 |
| 2016/0378359 | A1* | 12/2016 | Jang ..................... | G06F 3/0613 711/118 |
| 2017/0300252 | A1* | 10/2017 | Yim ...................... | G06F 3/0619 |

* cited by examiner

*Primary Examiner* — Gary J Portka
(74) *Attorney, Agent, or Firm* — IP & T Group LLP

(57) ABSTRACT

A memory system may include: a memory device comprising: a plurality of pages each having a plurality of memory cells coupled to a plurality of word lines and suitable for storing data; a plurality of memory blocks each having the pages; a plurality of planes each having the memory blocks; and a plurality of memory dies each having the planes, and a controller suitable for transmitting a request command for acquiring setting information on the memory device to the memory device, receiving an acknowledgement signal corresponding to the request command from the memory device, acquiring the setting information through the acknowledgement signal, and checking the setting information to perform a command operation based on a command received from a host on the memory device.

8 Claims, 11 Drawing Sheets

MEMORY SYSTEM AND OPERATING METHOD THEREOF

CROSS-REFERENCE TO RELATED APPLICATIONS

This U.S. non-provisional patent application claims priority under 35 U.S.C. § 119 to Korean Patent Application No. 10-2016-0055475 filed on May 4, 2016 in the Korean Intellectual Property Office (KIPO), the disclosure of which is incorporated herein by reference in its entirety.

BACKGROUND

1. Field

Exemplary embodiments of the present invention relate generally to a semiconductor memory system which processes data to a memory device and an operating method thereof.

2. Description of the Related Art

The computer environment paradigm has shifted to ubiquitous computing systems that can be used anytime and anywhere. Due to this, use of portable electronic devices such as mobile phones, digital cameras, and laptop computers has rapidly increased. These portable electronic devices generally use a semiconductor memory system (hereinafter memory system) having one or more semiconductor memory devices (hereinafter memory device) for storing data. The memory system may be used as a main memory or an auxiliary memory of a portable electronic device.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system capable of minimizing the complexity and performance reduction of a memory system and maximizing the efficiency of the memory device, thereby rapidly and stably processing data to the memory device, and an operating method thereof.

In an exemplary embodiment, a memory system may include: a memory device comprising: a plurality of pages each having a plurality of memory cells coupled to a plurality of word lines and suitable for storing data; a plurality of memory blocks each having the pages, a plurality of planes each having the memory blocks, and a plurality of memory dies each having the planes, and a controller suitable for transmitting a request command for acquiring setting information on the memory device to the memory device, receiving an acknowledgement signal corresponding to the request command from the memory device, acquiring the setting information through the acknowledgement signal, and checking the setting information to perform a command operation based on a command received from a host on the memory device.

The acknowledgement signal may include the setting information, and the setting information may include one or more of configuration information, organization information and addressing information of the memory device.

The acknowledgement signal comprises the setting information, and the setting information may include one or more of number information, organization information, configuration information and addressing information on the memory dies or the planes.

The acknowledgement signal may include the setting information, and the setting information may include a Logical Unit Number (LUN) of the memory device.

The acknowledgement signal may include the setting information, and the setting information may include one or more of number information, organization information, configuration information and addressing information on the memory blocks.

The acknowledgement signal may include the setting information, and the setting information may include a memory block value of the memory device.

The acknowledgement signal may include the setting information, and the setting information may include one or more of number information, organization information, configuration information and addressing information on the pages.

The acknowledgement signal may include the setting information, and the setting information may include a page value of the memory device.

The acknowledgement signal may include the setting information, and the setting information may include an address value of the memory device.

The controller may check address bits of the memory device through the address value, and may perform the command operation based on the address bits.

In an exemplary embodiment, an operating method of a memory system, may include: checking setting information on a memory device, wherein the memory device comprises a plurality of pages each having a plurality of memory cells coupled to a plurality of word lines and suitable for storing data, a plurality of memory blocks each having the pages a plurality of planes each having the memory blocks, and a plurality of memory dies each having the planes; generating a request command for acquiring the setting information to transmit the request command to the memory device; receiving an acknowledgement signal corresponding to the request command from the memory device, and acquiring the setting information through the acknowledgement signal; and checking the setting information to perform a command operation based on a command received from a host on the memory device.

The acknowledgement signal may include the setting information, and the setting information may include one or more of configuration information, organization information and addressing information of the memory device.

The acknowledgement signal may include the setting information, and the setting information may include one or more of number information, organization information, configuration information and addressing information on the memory dies or the planes.

The acknowledgement signal may include the setting information, and the setting information may include an LUN of the memory device.

The acknowledgement signal may include the setting information, and the setting information may include one or more of number information, organization information, configuration information and addressing information on the memory blocks.

The acknowledgement signal may include the setting information, and the setting information may include a memory block value of the memory device.

The acknowledgement signal may include the setting information, and the setting information may include one or more of number information, organization information, configuration information and addressing information on the pages.

The acknowledgement signal may include the setting information and the setting information may include a page value of the memory device.

The acknowledgement signal may include the setting information, and the setting information may include an address value of the memory device.

The checking of the setting information may include checking address bits of the memory device through the address value to perform the command operation based on the address bits.

BRIEF DESCRIPTION OF THE DRAWINGS

These and other features and advantages of the present invention of the present invention will be described in reference to the accompanying drawings, wherein.

DETAILED DESCRIPTION

Figure 1:
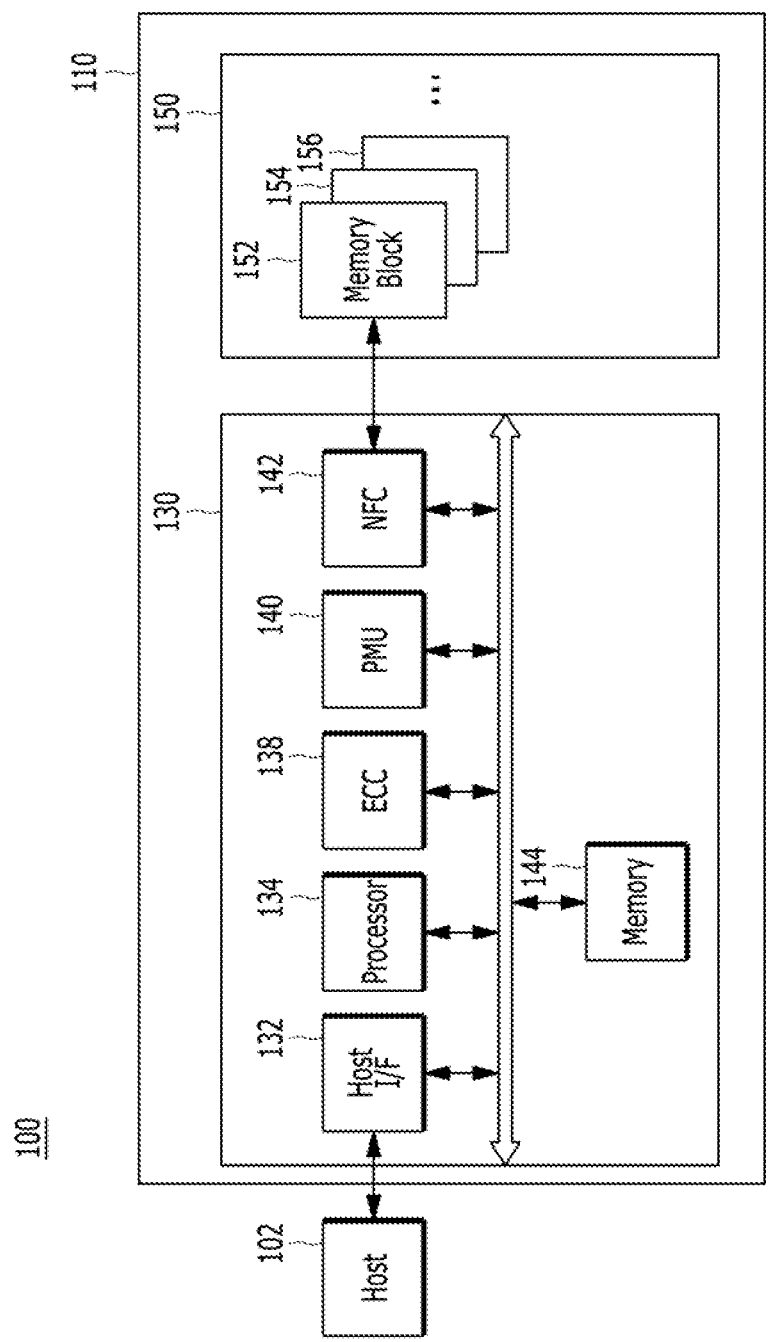
FIG. 1 is a diagram illustrating a data processing system including a memory system, according to an embodiment of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to dearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system, according to an embodiment of the present invention.

Referring to FIG. 1, the data processing system 100 may include a host 102 and a memory system 110.

The host 102 may include, for example, a portable electronic device such as a mobile phone, an MP3 player and a laptop computer or an electronic device such as a desktop computer, a game player, a television (TV) and a projector.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a com pact flash (CF) card, a smart media (SM) card, memory stick, and the like.

The storage devices forming the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), phase-change RAM (PRAM), a magnetoresistive RAM (MRAM) a resistive RAM (RRAM) and a flash memory.

The memory system 110 may include a memory device 50 and a controller 130. The memory device 150 stores data to be accessed by the host 102, and the controller 130 controls data exchange between the memory device 150 and the host 102. That is, under the control of the controller 130, data received from the host may be stored in the memory device 150.

The controller 130 and the memory device 150 may be integrated into one semiconductor device. For instance, the controller 130 and the memory device 150 may be integrated into one semiconductor device to form a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may configure a computer, an ultra-mobile PC (UMPC) a workstation, a net-book, a personal digital assistant (PDA), a portable computer, a web tablet, a tablet computer, a wireless phone a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power is blocked store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of a word line (WL) are electrically coupled. The memory cells may be single bit cells or multi-bit cells. The memory cells may be arranged in a two or three dimensional stacked structure. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control overall operations of the memory device 150, such as read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) a Block coded modulation (BCM), and so on. The ECC unit 138 may include all circuits, systems or devices for the error correction operation.

The PMU 140 may provide and manage power for the controller 130 that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory such as a static random access memory (SRAM) or a dynamic random access memory (DRAM). As described above, the memory 144 may store data used by the host 102 and the memory device 150 for the read and write operations. For such storage of the data the memory 144 may include a program memory, a data memory, a write buffer, a read buffer, a map buffer, and so forth.

The processor 134 may control general operations of the memory system 110, and a write operation or a read operation for the memory device 150 in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
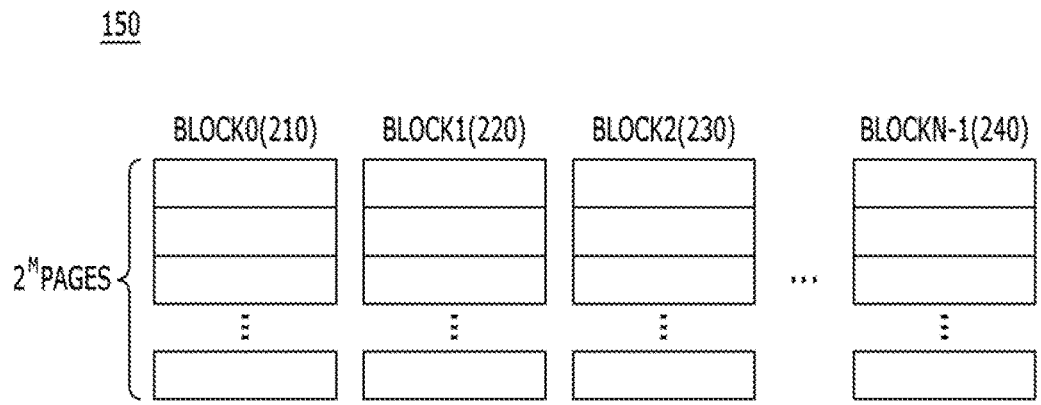
FIG. 2 is a diagram illustrating an, example of a memory device employed in the memory system of FIG. 1.

FIG. 2 is a detailed diagram of the memory device 150 shown in FIG. 1.

Referring to FIG. 2, the memory device 150 may include a plurality of memory blocks, for example, a zeroth memory block (BLOCK0) 210, a first memory block (BLOCK1) 220, a second memory block (BLOCK2) 230 and an N-1$^{th}$ memory block (BLOCKN-1) 240. Each of the memory blocks 210 to 240 may include a plurality of pages, for example, $2^M$ number of pages ($2^M$ PAGES). Each of the pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the memory blocks 210 to 240 may store the data provided from the host 102 during a write operation, and provide the stored data to the host 102 during a read operation.

Figure 3:
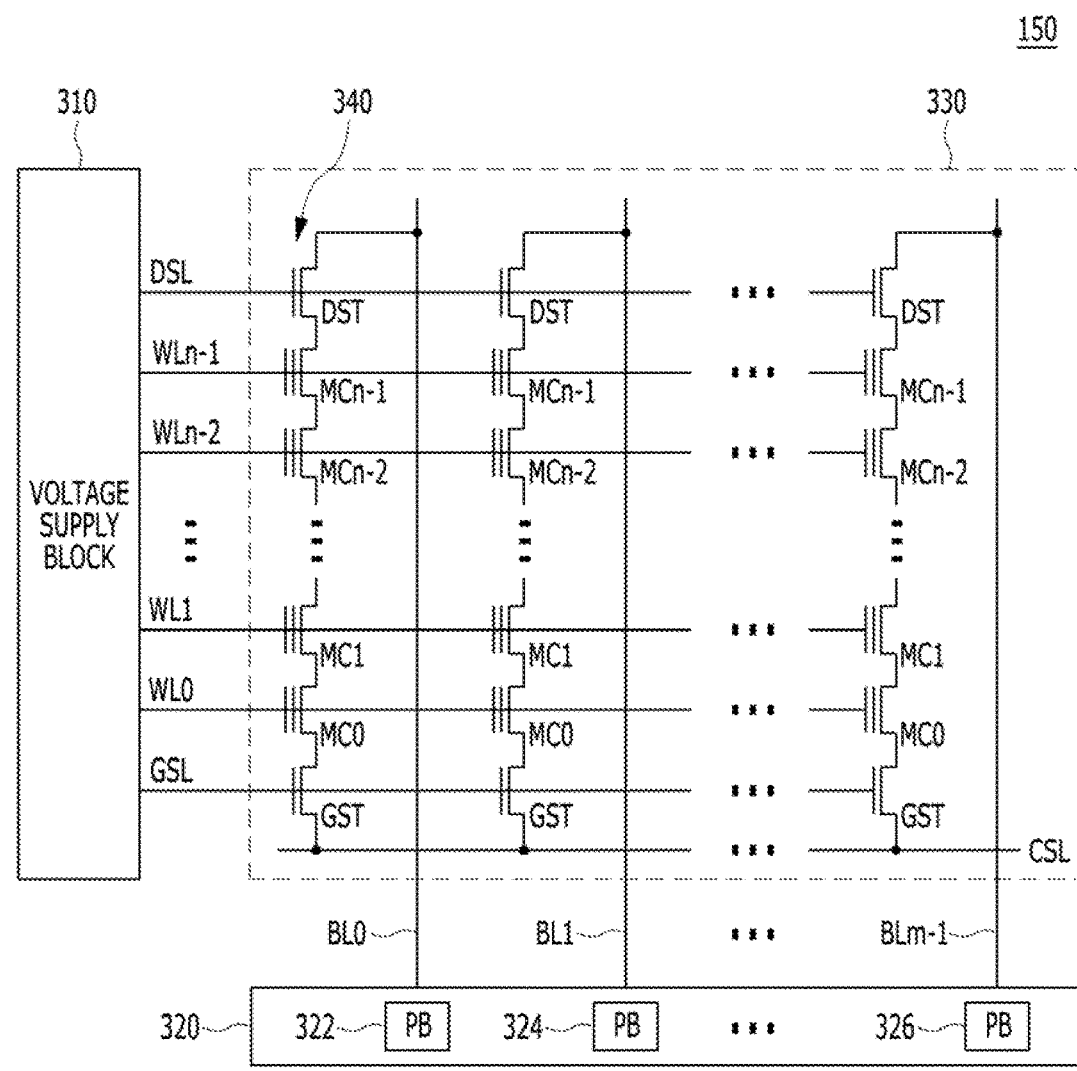
FIG. 3 is a circuit diagram illustrating a memory block in a memory device according to an embodiment of the present invention.

FIG. 3 is a diagram illustrating a memory device 150 including the memory block shown in FIG. 2. FIG. 3 shows a detailed configuration of a single memory block 330 and circuits related thereto 310 and 320.

Referring to FIG. 3, the memory block 330 may include a plurality of cell strings 340 which are electrically coupled to bit lines BL0 to BLm-1, respectively. The cell string 340 of each column may include at least one drain select transistor (i.e., string select transistor) DST and at least one ground select transistor (i.e., source select transistor) GST. A plurality of memory cell transistors MCD to MCn-1 may be electrically coupled in series between the select transistors GST and DST. The respective memory cells MCD to MCn-1 may be configured by multi-level cells (MLC) each of which stores data information of a plurality of bits. The cell strings 340 may be electrically coupled to the corresponding bit lines BL0 to BLm-1, respectively. For reference, in FIG. 3, 'DSL' denotes a drain select line (i.e., a string select line), 'GSL' denotes a ground select line (i.e., a source select line), and 'CSL' denotes a common source line.

While FIG. 3 shows, as an example, the memory block 330 which is configured by NAND flash memory cells, it is to be noted that the memory block 330 of the memory device 300 according to an exemplary embodiment of the present invention is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 may be controlled by the control circuit, and may serve as a sense amplifier or a write driver according to an operation mode. During verification/normal read operation, the read/write circuit 320 may serve as a sense amplifier for reading data from the memory cell array. Also during a program operation, the read/write circuit 320 may serve as a write driver which drives bit lines according to data to be stored in the memory cell array. The read/write circuit 320 may receive data to be written in the memory cell array, from a buffer (not shown) during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagrams illustrating various aspects of the memory device 150 of FIG. 1.

Figure 4:
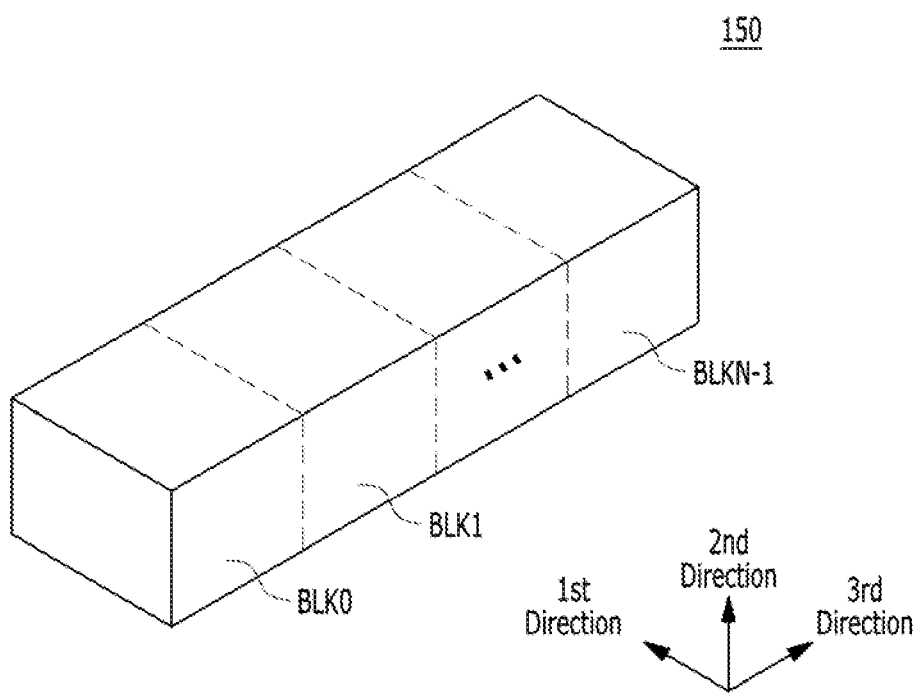
FIGS. 4 to 11 are diagrams schematically illustrating various aspects of the memory device of FIG. 1.

FIG. 4 is a block diagram illustrating an example of the plurality of memory blocks of the memory device 150.

Referring to FIG. 4, the memory device 150 may include a plurality of memory blocks BLK0 to BLKN-1, and each of the memory blocks BLK0 to BLKN-1 may be realized in a three-dimensional (3D) structure or a vertical structure. The respective memory blocks BLK0 to BLKN-1 may include structures which extend in first to third directions, for example, an x-axis direction, a y-axis direction and a z-axis direction.

The respective memory blocks BLK0 to BLKN−1 may include a plurality of NAND strings extending in the second direction. The plurality of NAND strings may be provided in the first direction and the third direction. Each NAND string may be electrically coupled to a bit line, at least one drain select line, at least one ground select line, a plurality of word lines, at least one dummy word line, and a common source line. Namely, the respective memory blocks BLK0 to BLKN−1 may be electrically coupled to a plurality of bit lines, a plurality of drain select lines, a plurality of ground select lines, a plurality of word lines, a plurality of dummy word lines, and a plurality of common source lines.

Figure 5:
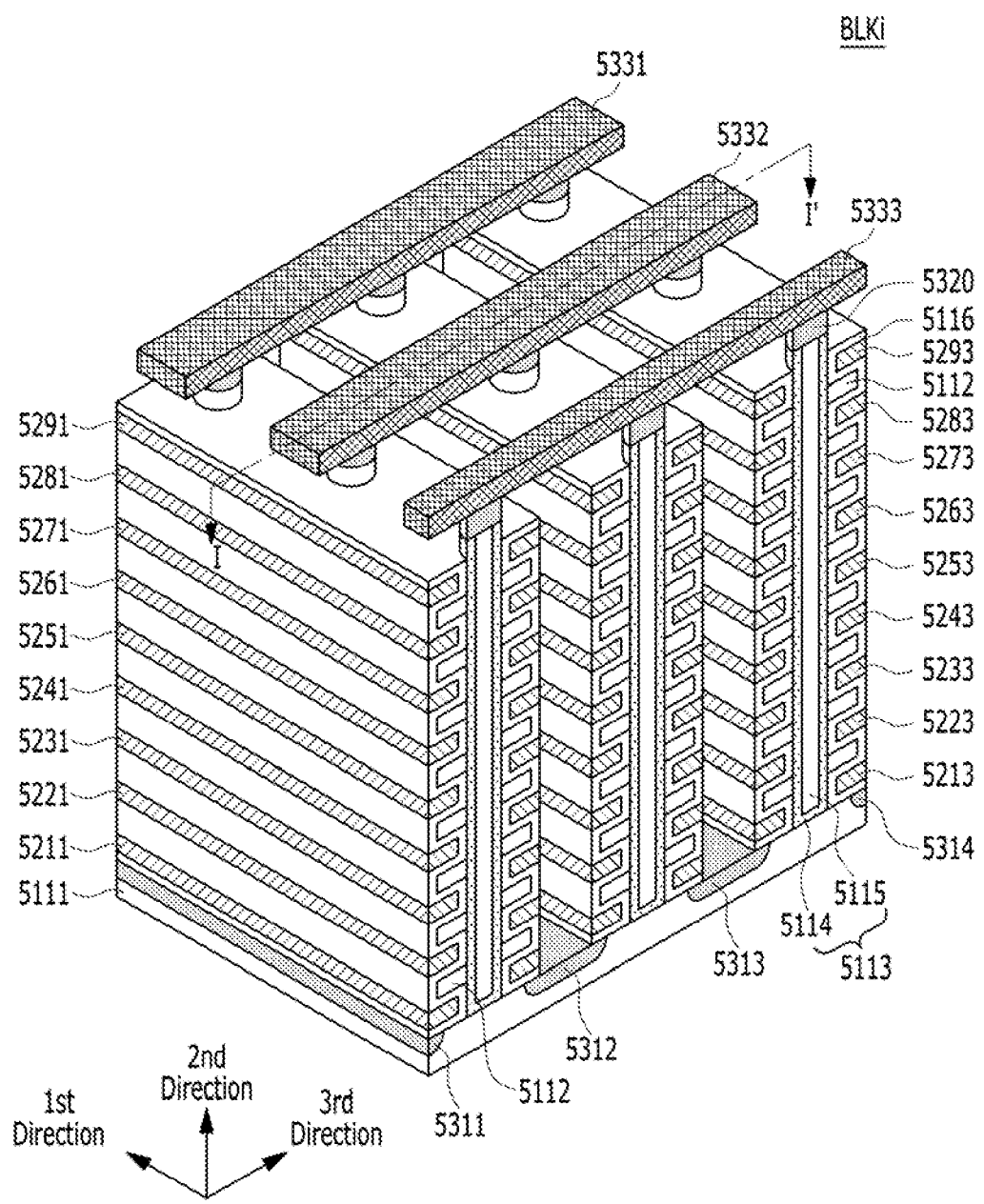
Figure 6:
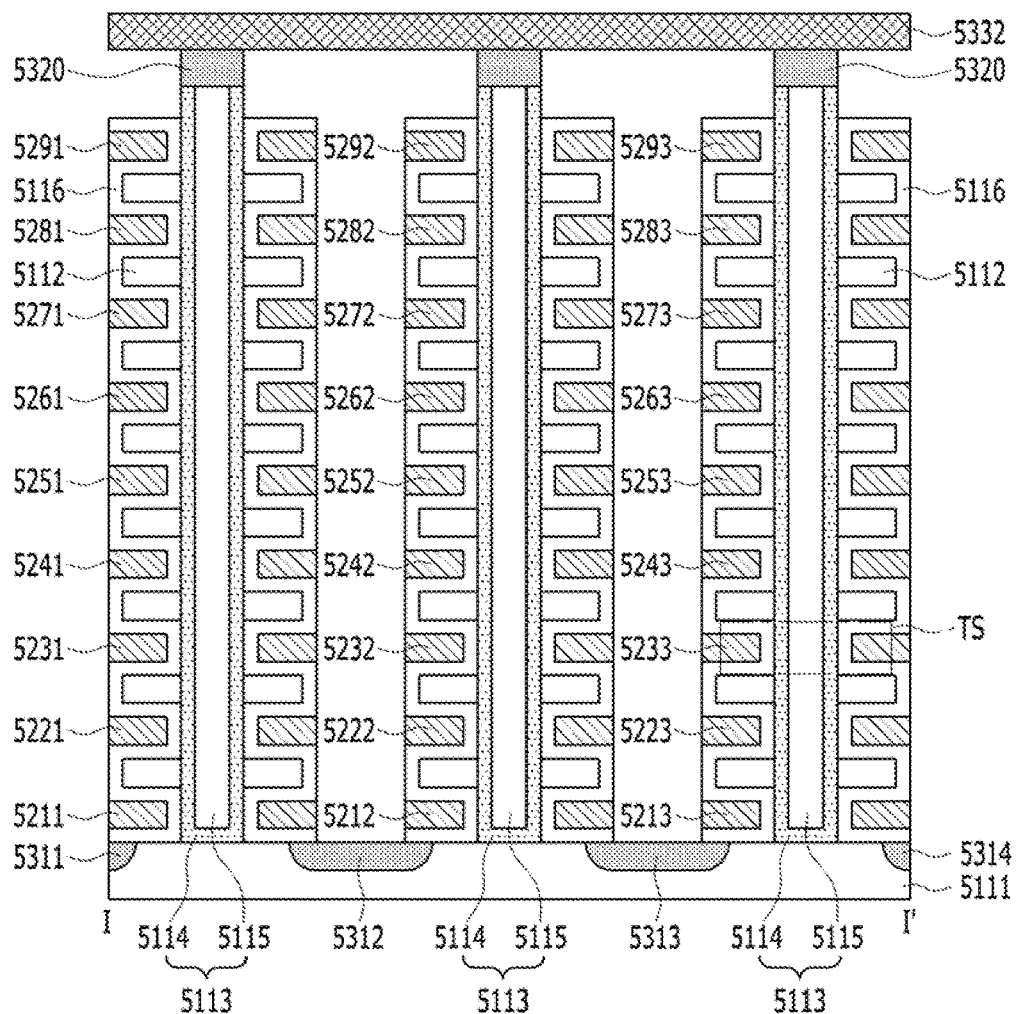

FIG. 5 is a perspective view of one BLKi of the plural memory blocks BLK0 to BLN−1 of FIG. 4. FIG. 6 is a cross-sectional view taken along a line of the memory block BLKi of FIG. 5.

Referring to FIGS. 5 and 6, a memory block BLKi among the plurality of memory blocks of the memory device 150 may include a structure which extends in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While it is assumed that the substrate 5111 is p-type silicon, it is to be noted that the substrate 5111 is not limited to being p-type silicon.

A plurality of doped regions 5311 to 5314 extending in the first direction may be provided on the substrate 5111. The plurality of doped regions 5311 to 5314 may contain impurities (i.e., second type impurities), different from the impurities contained in the substrate 5111 (i.e. first type impurities). The plurality of doped regions 5311 to 5314 may be doped with an n-type impurity. While it is assumed here that first to fourth doped regions 5311 to 5314 are n-type, it is to be noted that the first to fourth doped regions 5311 to 5314 are not limited to being n-type. In an exemplary embodiment, the plurality of doped regions 5311 to 5314 may be formed in the substrate 5111.

In the region over the substrate 5111 between the first and second doped regions 5311 and 5312, a plurality of dielectric materials 5112 extending in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide, silicon nitride, silicon oxy-nitride, or combinations thereof.

In the region over the substrate 5111 between the first and second doped regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. A surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not lifted to being p-type silicon. In an exemplary embodiment, the surface layer 5114 may be in directly contact with the substrate 5111.

An inner layer 5115 of each pillar 5113 may be formed of a dielectric material. The inner layer 5115 of each pillar 5113 may be filled by a dielectric material such as silicon oxide.

In the region between the first and second doped regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doped regions 5311 and 5312, conductive materials 5211 to 5291 may be provided over the exposed surface of the dielectric layer 5116. The conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 extending in the first direction may be provided between the dielectric materials 5112. The conductive material 5291 which extends in the first direction may be provided over the uppermost dielectric material 5112. The conductive materials 5211 to 5291 extending in the first direction may be a metallic material. The conductive materials 5211 to 5291 extending in the first direction may be a conductive material such as polysilicon, metal, metal-nitride, metal-oxide, metal-silicide, conductive carbon, or combinations thereof.

In the region between the second and third doped regions 5312 and 5313, the same structures as the structures between the first and second doped regions 5311 and 5312 may be provided. For example, in the region between the second and third doped regions 5312 and 5313, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 extending in the first direction may be provided.

In the region between the third and fourth doped regions 5313 and 5314, the same structures as between the first and second doped regions 5311 and 5312 may be provided. For example, in the region between the third and fourth doped regions 5313 and 5314, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113 and the plurality of conductive materials 5213 to 5293 extending in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive materials 5331 to 5333 extending in the third direction may be provided over the drains 5320. The conductive materials 5331 to 5333 may be sequentially disposed in the first direction. The respective conductive materials 5331 to 5333 may be electrically coupled with the drains 5320 of corresponding regions. The drains 53200 and the conductive materials 5331 to 5333 extending in the third direction may be electrically coupled with through contact plugs. The conductive materials 5331 to 5333 extending in the third direction may be a metallic material. The conductive materials 5331 to 5333 extending in the third direction may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 extending in the first direction. The respective pillars 5113 may form NAND strings together with the dielectric layer 5116 and the conductive materials 5211 to 5291, 5212 to 5292 and 5213 to 5293 extending in the first direction. Each NAND string may include a plurality of transistor structures TS.

Figure 7:
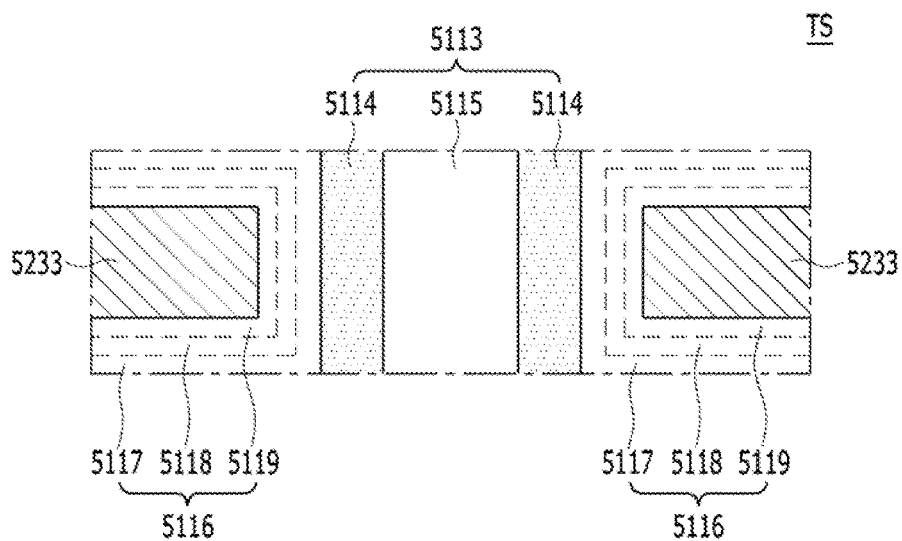

FIG. 7 is a detailed cross-sectional view of the transistor structure TS of FIG. 6.

Referring to FIG. 7, in the transistor structure TS of FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience the surface layer 5114 of p-type silicon in each of the pillars 5113 will be referred to as a body in the second direction.

The memory block BLKi may include the plurality of pillars 5113. Namely, the memory block BLKi may include the plurality of NAND strings. In detail, the memory block BLKi may include the plurality of NAND strings extending in the second direction or a direction perpendicular to the substrate 5111.

Each NAND string may include the plurality of transistor structures TS which are disposed in the second direction. At least one of the plurality of transistor structures TS of each NAND string may serve as a drain select transistor (i.e., a string select transistor). At least one of the plurality of transistor structures TS of each NAND string may serve as a ground select transistor (i.e., a source select transistor).

The gates or control gates may correspond to the conductive materials 5211 to 5291, 5212 to 5292 and 5213 to 5293 extending in the first direction. In other words, the gates or the control gates may extend in the first direction and form word lines and at least one drain select line and at least one ground select line.

The conductive materials 5331 to 5333 extending in the third direction may be electrically coupled to one end of the NAND strings. The conductive materials 5331 to 5333 extending in the third direction may serve as bit lines. That is, in one memory block BLKi, the plurality of NAND strings may be electrically coupled to one bit line.

The second type doped regions 5311 to 5314 extending in the first direction may be provided to the other ends of the NAND strings. The second type doped regions 5311 to 5314 extending in the first direction may serve as common source lines.

Namely, the memory block BLKi may include a plurality of NAND strings extending in a direction perpendicular to the substrate 5111, e.g., the second direction, and may serve as a NAND flash memory block, for example, of a charge capturing type memory, in which a plurality of NAND strings are electrically coupled to one bit line.

While it is illustrated in FIGS. 5 to 7 that the conductive materials 5211 to 5291, 5212 to 5292 and 5213 to 5293 extending in the first direction are provided in 9 layers, it is to be noted that the conductive materials 5211 to 5291, 5212 to 5292 and 5213 to 5293 extending in the first direction are not limited to being provided in 9 layers. For example, conductive materials extending in the first direction may be provided in 8 layers, 16 layers or any multiple of layers. In other words, in one NAND string, the number of transistors may be 8, 16 or more.

While it is illustrated in FIGS. 5 to 7 that 3 NAND strings are electrically coupled to one bit line, it is to be noted that the embodiment is not limited to having 3 NAND strings that are electrically coupled to one bit line. In the memory block BLKi, m number of NAND strings may be electrically coupled to one bit line, where m is a positive integer. According to the number of NAND strings which are electrically coupled to one bit line, the number of conductive materials 5211 to 5291, 5212 to 5292 and 5213 to 5293 extending in the first direction and the number of common source lines 5311 to 5314 may be controlled as well.

Further, while it is illustrated in FIGS. 5 to 7 that 3 NAND strings are electrically coupled to one conductive material which extends in the first direction, it is to be noted that the embodiment is not limited to having 3 NAND strings electrically coupled to one conductive material which extends in the first direction. For example, n number of NAND strings may be electrically coupled to one conductive material which extends in the first direction, n being a positive integer. According to the number of NAND strings which are electrically coupled to one conductive material which extends in the first direction, the number of bit lines 5331 to 5333 may be controlled as well.

Figure 8:
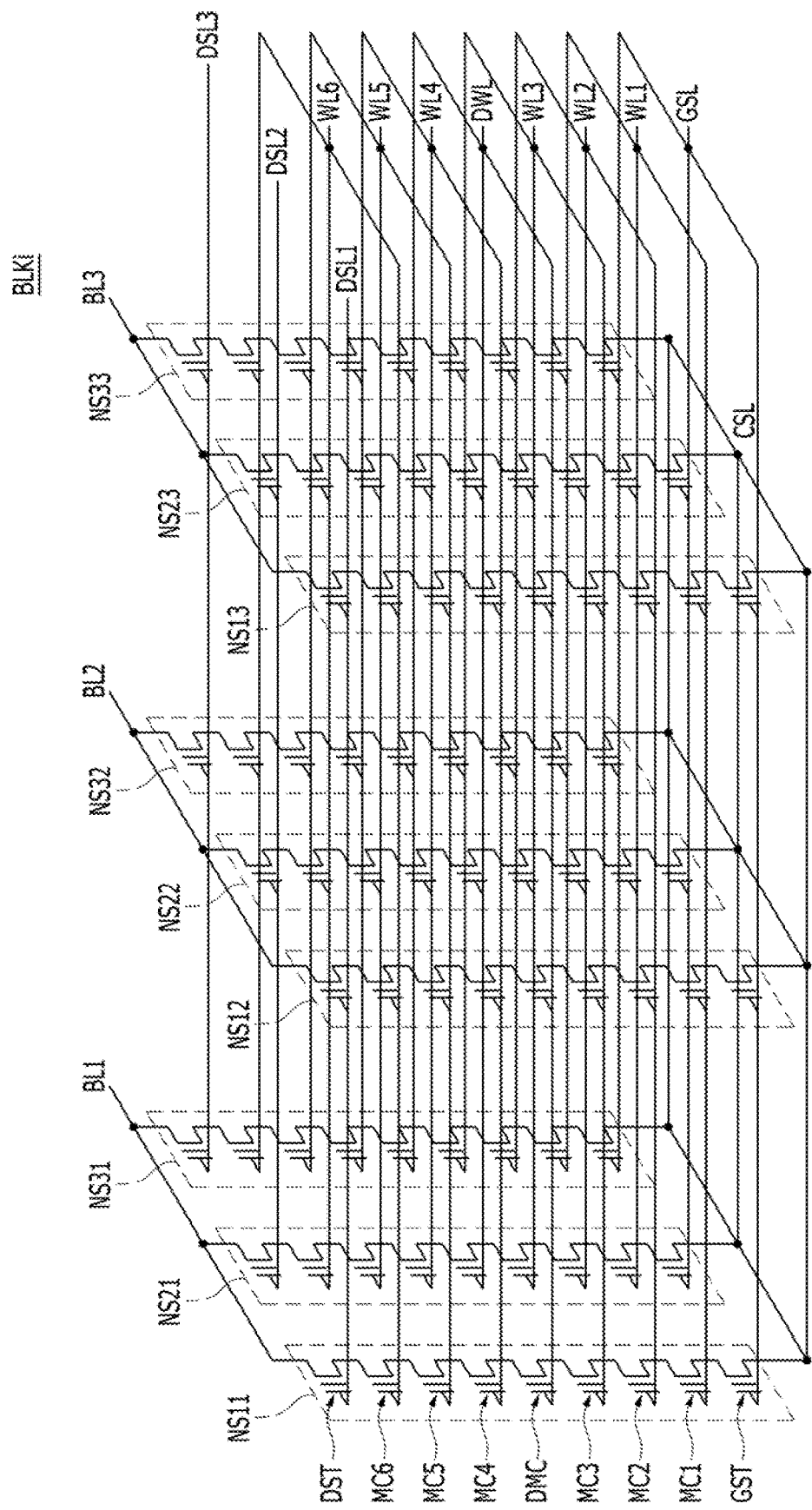

FIG. 8 is a circuit diagram illustrating the memory block having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A drain select transistor (i.e., a string select transistor) DST of each NAND string may be electrically coupled to a corresponding bit line. A ground select transistor (i.e., a source select transistor) GST of each NAND string may be electrically coupled to the common source line CSL. Memory cells MC1 to MC6 may be provided between the drain select transistor DST and the ground select transistor GST of each NAND string.

In this example, NAND strings may be defined by units of rows and columns and NAND strings which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings which are electrically coupled to one drain select line may form one row. The NAND strings NS11 to NS13 which are electrically coupled to a first drain select line DSL1 may form a first row, the NAND strings NS21 to NS23 which are electrically coupled to a second drain select line DSL2 may form a second row, and the NAND strings NS31 to NS33 which are electrically coupled to a third drain select line DSL3 may form a third row.

In each NAND string, a height may be defined. In each NAND string, the height of a memory cell MC1 adjacent to the ground select transistor GST may have a value '1'. In each NAND string, the height of a memory cell may increase as the memory cell gets closer to the drain select transistor DST when measured from the substrate 5111. In each NAND string, the height of a memory cell MC6 adjacent to the drain select transistor DST may be 7.

The drain select transistors DST of the NAND strings in the same row may share the drain select, line DSL. The drain select transistors of the NAND strings in different rows may be respectively electrically coupled to the different drain select lines DSL1, DSL2 and DSL3.

The memory cells at the same height in the NAND strings in the same row may share a word line. That is, at the same height, the word lines electrically coupled to the memory cells of the NAND strings in different rows may be electrically coupled. Dummy memory cells DMC at the same height in the NAND strings of the same row may share a dummy word line DWL. Namely, at the same height or level, the dummy word lines DWL electrically coupled to the dummy memory cells DMC of the NAND strings in different rows may be electrically coupled.

The word lines or the dummy word lines DWL located at the same level or height or layer may be electrically coupled with one another at layers where the conductive materials 5211 to 5291, 5212 to 5292 and 5213 to 5293 extending in the first direction may be provided. The conductive materials 5211 to 5291, 5212 to 5292 and 5213 to 5293 extending in the first direction may be electrically coupled in common to upper layers through contacts. At the upper layers, the conductive materials 5211 to 5291, 5212 to 5292 and 5213 to 5293 extending in the first direction may be electrically coupled. In other words, the ground select transistors GST of the NAND strings in the same row may share the ground select line GSL. Further, the ground select transistors GST of the NAND strings in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings. Over the active regions and over the substrate 5111, the first to fourth doped regions 5311 to 5314 may be electrically coupled. The first to fourth doped regions 5311 to 5314 may be electrically coupled to an upper layer through contacts and, at the upper layer, the first to fourth doped regions 5311 to 5314 may be electrically coupled.

Namely, as of FIG. 8, the word lines of the same height or level may be electrically coupled. Accordingly, when a word line at a specific height is selected, all NAND strings which are electrically coupled to the word line may be selected. The NAND strings in different rows may be electrically coupled to different drain select lines. Accordingly, among the NAND strings electrically coupled to the same word line, by selecting one of the drain select lines DSL1 to DSL3, the NAND strings in the unselected rows may be electrically isolated from the bit lines BL1 to BL3. In other words, by selecting one of the drain select lines DSL1 to DSL3, a row of NAND strings may be selected. Moreover, by selecting one of the bit lines BL1 to BL3, the NAND strings in the selected rows may be selected in units of columns.

In each NAND string, a dummy memory cell DMC may be provided. In FIG. 8, the dummy memory cell DMC may be provided between a third memory cell MC3 and a fourth memory cell MC4 in each NAND string. That is, first to third memory cells MC1 to MC3 may be provided between the dummy memory cell DMC and the ground select transistor GST. Fourth to sixth memory cells MC4 to MC6 may be provided between the dummy memory cell DMC and the drain select transistor DST. The memory cells of each NAND string may be divided into memory cell groups by the dummy memory cell DMC. In the divided memory cell groups memory cells, for example, MC1 to MC3, adjacent to the ground select transistor GST may be referred to as a lower memory cell group, and memory cells, for example, MC4 to MC6, adjacent to the drain select transistor (i.e., string select transistor DST) may be referred to as an upper memory cell group.

Hereinbelow, detailed descriptions will be made with reference to FIGS. 9 to 11, which show the memory device in the memory system according to an embodiment implemented with a three-dimensional (3D) nonvolatile memory device different from the first structure.

Figure 9:
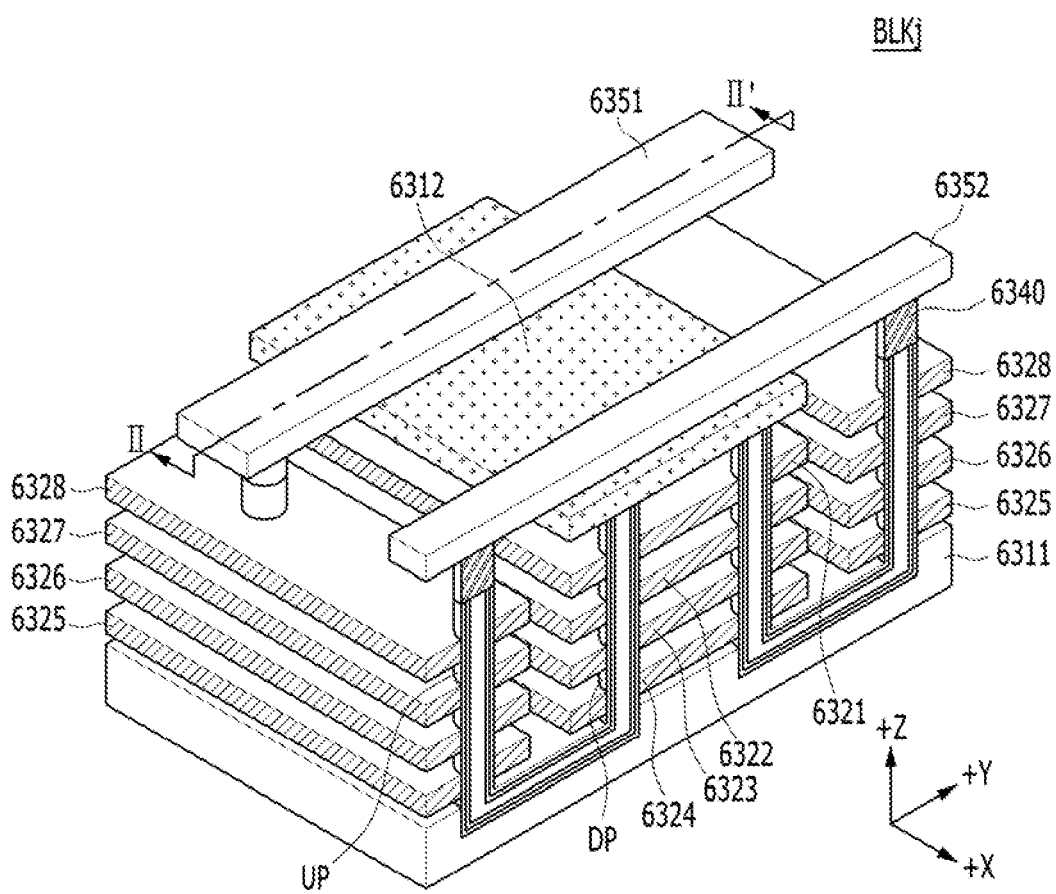

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line II-II' of FIG. 9.

Figure 10:
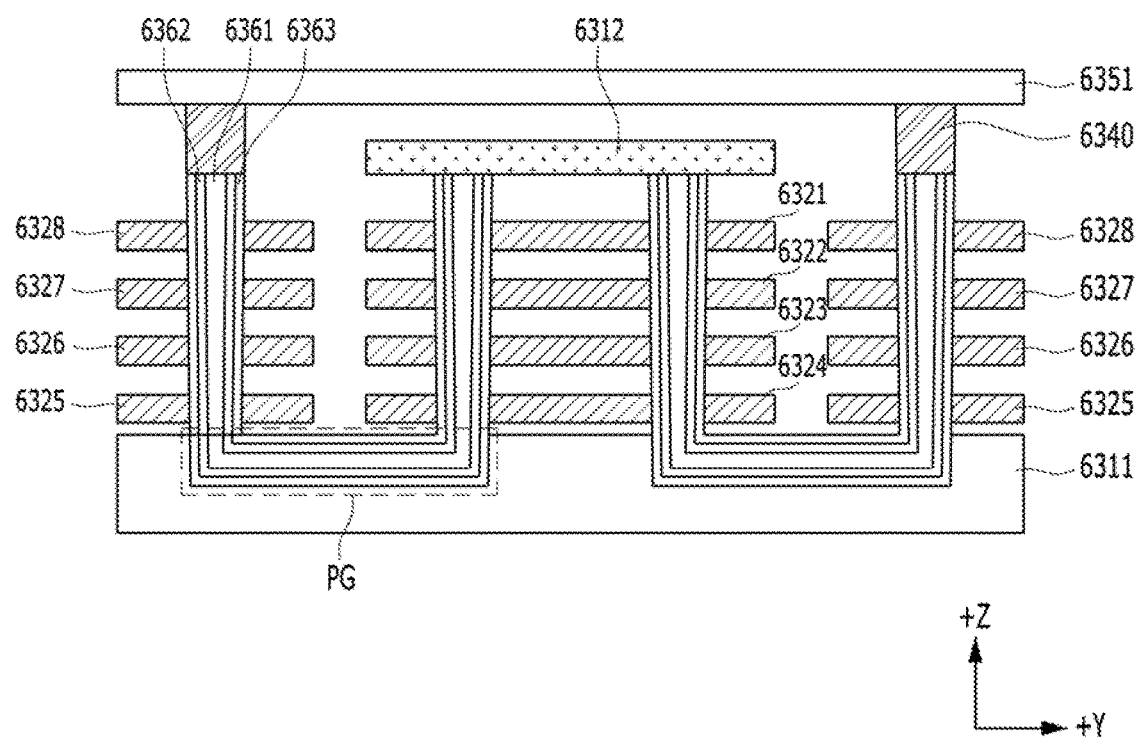

Referring to FIGS. 9 and 10, the memory block BLKj among the plurality of memory blocks of the memory device 150 of FIG. 1 may include structures extending in the first to third directions (i.e., x-axis, y-axis, and z-axis).

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience that the substrate 6311 is p-type silicon, it is to be noted that the substrate 6311 is not limited to being p-type silicon.

First to fourth conductive materials 6321 to 6324 extending in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 extending in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doped material 6312 of a second type which extends in the x-axis direction and the y-axis direction may be provided over the lower pillars DP. For example, the doped material 6312 of the second type may include an n-type silicon material. The doped material 6312 of the second type may serve as common source line CSL.

Drains 6340 may be provided over the upper pillars UP. The drains 6340 may include an n-type silicon material. First and second upper conductive materials 6351 and 6352 extending in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively serve as first and second bit lines BL1 and BL2.

The first conductive material 6321 may serve as a ground select line (i.e., a source select line), the second conductive material 6322 may serve as a first dummy word line, and the third and fourth conductive materials 6323 and 6324 serve as first and second main word lines, respectively. The fifth and sixth conductive materials 6325 and 6326 serve as third and fourth main word lines, respectively, the seventh conductive material 6327 may serve as a second dummy word line, and the eighth conductive material 6328 may serve as a drain select line (i.e., a string select line).

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be electrically coupled through the pipe gate PG. One end of the lower string may be electrically coupled to the doped material 6312 of the second type which serves as the common source line. One end of the upper string may be electrically coupled to a corresponding bit line through the drain 6340. One lower string and one upper string form one cell string which is electrically coupled between the doped material 6312 of the second type serving as the common source line and a corresponding on e of the upper conductive material layers 6351 and 6352 serving as the bit line.

That is, the lower string may include a source select transistor, the first dummy memory cell, and the first and second main memory cells. The upper string may include the third and fourth main memory cells, the second dummy memory cell, and a drain select transistor.

In FIGS. 9 and 10, the upper string and the lower string may form a NAND string, and the NAND string may include a plurality of transistor structures. Since the transistor structure included in the NAND string in FIGS. 9 and 10 is described above in detail with reference to FIG. 7, a detailed description thereof will be omitted herein.

Figure 11:
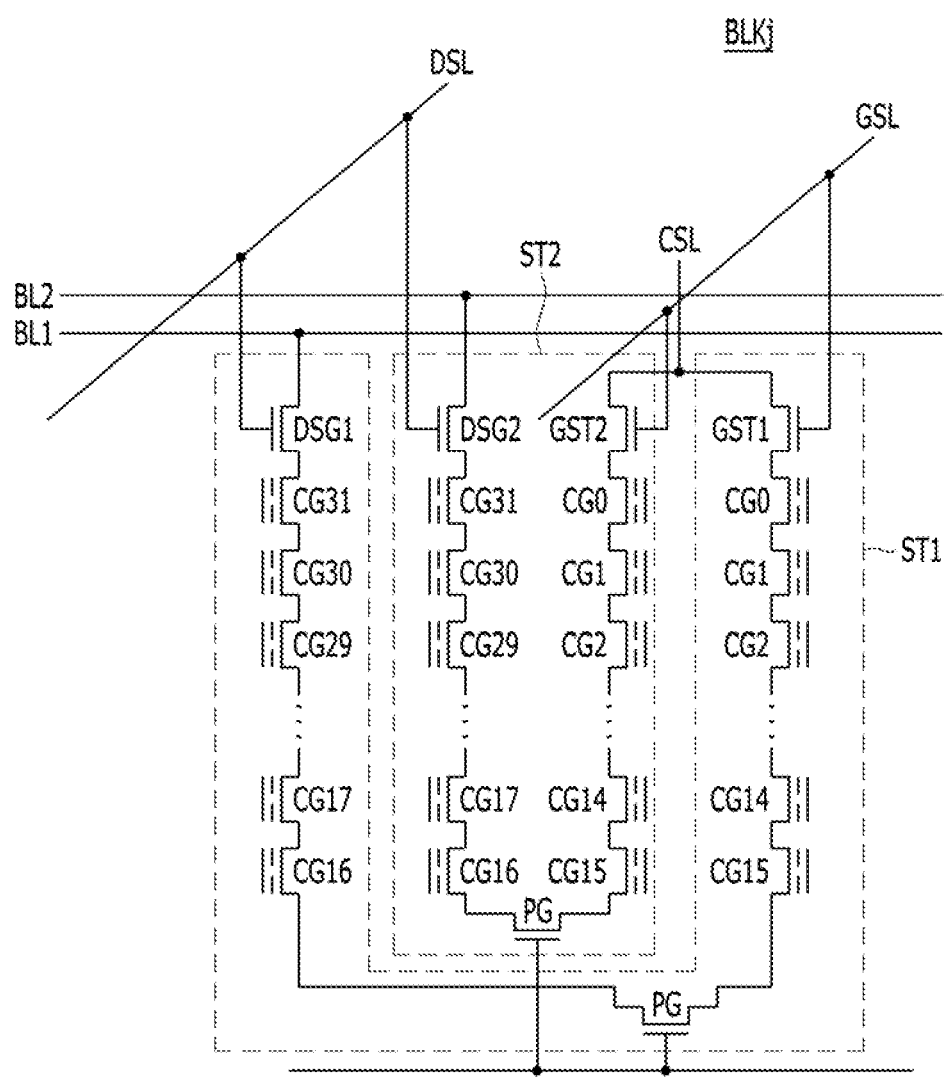

FIG. 11 is a circuit diagram illustrating of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel (not shown), for example, at least one ground select gate (i.e., source select gate) GSG1 and at least one drain select gate (i.e., string select gate) DSG1 may form a first string ST1, and memory cells CG0 to CG31 stacked along a second channel (not shown) for example, at least one ground select gate GSG2 and at least one drain select gate DSG2 may form a second string ST2.

The first string ST1 and the second string ST2 may be electrically coupled to the same drain select line DSL and the same ground select line GSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same ground select line GSL, it may be envisaged that the first string ST1 and the second string ST2 may be electrically coupled to the same ground select line GSL and the same bit line, the first string ST1 may be electrically coupled to a first drain select line and the second string ST2 may be electrically coupled to a second drain select line. Further it may be envisaged that the first string ST1 and the second string ST2 may be electrically coupled to the same drain select line DSL and the same bit line, the first string ST1 may be electrically coupled to a first ground select line and the second string ST2 may be electrically coupled a second ground select line.

Hereafter, an operation of processing data to a memory device in a memory system according to an embodiment of the present invention will be described in reference to FIGS. 12 and 13. Particularly, a command operation corresponding to a command received from a host 102, for example, an operation of processing command data to the memory device 150 will be described in detail with reference to FIGS. 12 and 13.

Figure 12:
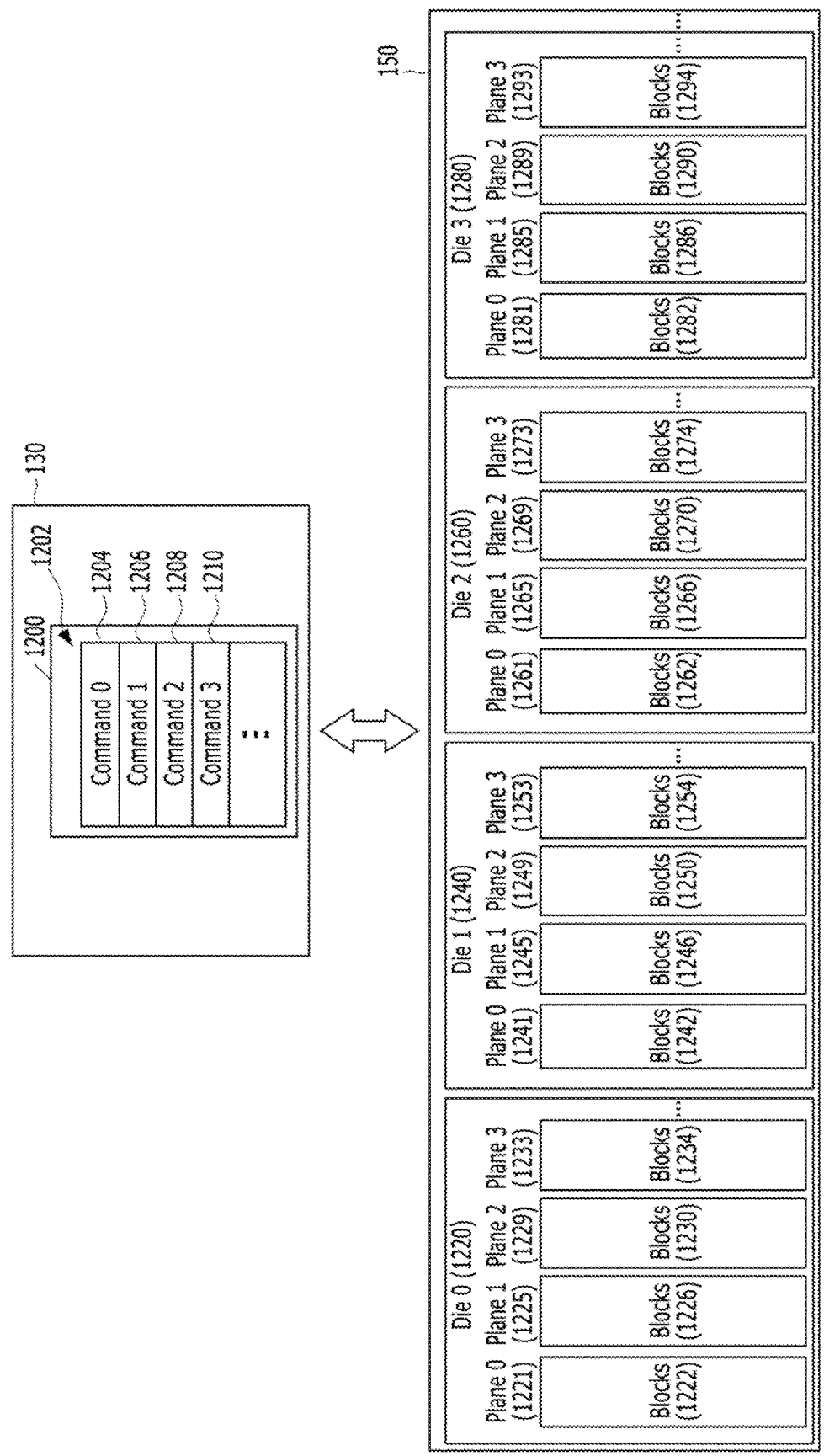
FIG. 12 is a diagram schematically describing an example of an operation of processing data to a memory device in a memory system, according to an embodiment of the present invention.

FIG. 12 schematically describes an example of an operation of processing data to a memory device in a memory system according to an embodiment of the present invention. In the illustrated embodiment, the controller 130 of the memory system 110 illustrated in FIG. 1 may transmit a command to request setting information on the memory device 150, and receive an acknowledgement (Ack) signal containing the setting information as a response to the command from the memory device 150, in order to acquire the setting information of the memory device 150. The setting information of the memory device 150 may be, for example, configuration information, organization information and addressing information of the memory device 150. Then, the controller 130 of the memory system 110 may check the setting information of the memory device 150, and perform the received command for the memory device 150 using the setting information of the memory device 150. For example, when the received command is a read command for data stored in the memory device 150, the controller 130 may store read data read from a memory location of the memory device 150 corresponding to the command received from the host 102, in a buffer/cache included in the memory 144 of the controller 130, from one or more of memory blocks included in the memory device 150, and thus, perform the read operation for the read data corresponding to the read command received from the host 102. In another embodiment, when the received command is a write command for write data to be stored in the memory device 150, the controller 130 of the memory system 110 may check the setting information of the memory device 150, store the write data corresponding to the write command received from the host 102 in a buffer/cache included in the memory 144 of the controller 130, write the data stored in the buffer/cache to one or more memory blocks included in the memory device 150, and thus, perform the write operation for the write data corresponding to the write command received from the host 102.

Figure 13:
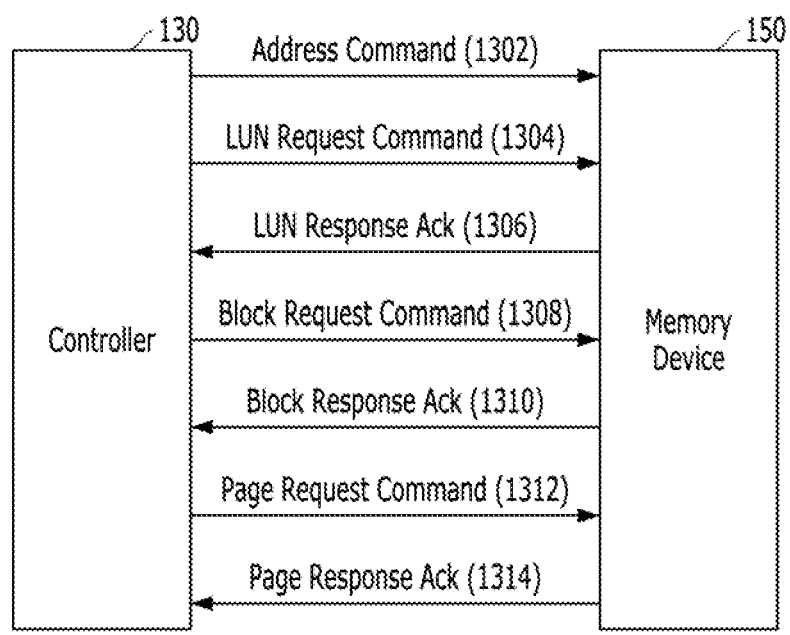
FIG. 13 is a flowchart schematically illustrating an operation of transmitting/receiving a command for data processing in the memory system shown in FIG. 12.

In the illustrated embodiment of FIGS. 12 and 13, is described, as an example, that a data processing operation in the memory system 110 is performed by the controller 130. More particularly, in an embodiment, the processor 134 included in the controller 130 may perform a data processing operation through a FTL, for example. Furthermore, when the setting information for the memory device 150, for example, a data sheet for the memory device 150, does not exist in the controller 130, the controller 130 may request and acquire the setting information for the memory device 150. Then in a write operation, the controller 130 may store user data and meta data corresponding to a write command received from the host 102 in a buffer included in the memory 144 of the controller 130, based on the setting information for the memory device 150. Then, the controller 130 may program the write data stored in the buffer to an arbitrary memory block among the plurality of memory blocks included in the memory device 150 (program operation). Otherwise, in a read operation, the controller 130 may read user data and meta data from a physical location corresponding to a logical address of the read command received from the host 102, for example, from one or more pages included in the corresponding memory block of the memory device 150, and store the read data in the buffer included in the memory 144 of the controller 130 based on the setting information for the memory device 150. Then, in the read operation, the controller 130 may provide the data stored in the buffer to the host 102 (read operation).

The meta data corresponding to the program operation may include first map data containing L2P (Logical to Physical) information on the data stored in the memory blocks and second map data containing P2L (Physical to Logical) information on the data. The L2P information will be referred to as 'logical information', and the P2L information will be referred to as 'physical information'. Furthermore, the meta data may include information on command data corresponding to a command received from the host 102, information on a command operation corresponding to the command, information on memory blocks of the memory device 150 in which the command operation is performed, and information on map data corresponding to the command operation. In other words, the meta data may include all information and data excluding user data corresponding to the command received from the host 102.

In the illustrated embodiment, the memory device 150 includes a plurality of memory dies, each of the memory dies includes a plurality of planes, and each of the planes includes a plurality of memory blocks. Furthermore, as described with reference to FIG. 2, each of the memory blocks includes a plurality of pages. Furthermore, in the illustrated embodiment, the controller 130 requests the setting information on, the memory device 150 from the memory device 150, and acquires the setting information on the memory device 150, for example, the setting information on the memory dies, the planes, the memory blocks and the pages, which are included in the memory device 150. Then, the controller 130 performs a command operation corresponding to the command received from the host 102. In other words, when a write command is received from the host 102, the controller 130 may program and store user data and meta data of the command operation corresponding to the write command received from the host 102 into the memory blocks, or when a read c and is received form the host 102, the controller 130 may read the user data and meta data stored in the memory blocks and provide the read data to the host 102.

In the present embodiment of FIGS. 12 and 13, when a data sheet, on which the setting information (e.g., including at least one of the configuration information, organization information and addressing information on the memory dies, the planes, the memory blocks and the pages) on the memory device 150 are written, does not exist in the controller 130, the controller 130 may transmit one or more commands to the memory device 150, the one or more commands requesting the setting information of the memory device 150. Then, the controller 130 receives one or more Ack signals as responses to the respective one or more setting request commands, the Ack signals containing the requested setting information of the memory device 150, and acquires the requested setting information on the memory device 150. Hereafter, the data processing operation in the memory system according to the present embodiment will be described in more detail with reference to FIG. 12.

Referring to FIG. 12, when the setting information on the memory device 150 does not exist in the memory 144 or the processor 134 of the controller 130, the controller 130 may generate a plurality of commands 1202 for acquiring the setting information of the memory device 150, and store the generated plurality of commands 1202 in a queuing unit 1200 of the controller 130. For example, the queuing unit 1220 may be included in the memory 144 of the controller 130. Then, in order to acquire the setting information on the memory device 150, the controller 130 may transmit the commands 1202 to the memory device 150 and request the setting information on the memory device 150.

The memory device 150 may include a plurality of memory dies, for example, a memory die 0 (1220), a memory die 1 (1240), a memory die 2 (1260) and a memory die 3 (1280). Each of the memory dies 1220, 1240, 1260 and 1280 may include a plurality of planes. For example, the memory die 0 (1220) may include a plane 0 (1221), a plane 1 (1225), a plane 2 (1229) and a plane 3 (1233), the memory die 1 (1240) may include a plane 0 (1241), a plane 1 (1245), a plane 2 (1249) and a plane 3 (1253), the memory die 2 (1260) may include a plane 0 (1261), a plane 1 (1265), a plane 2 (1269) and a plane 3 (1273), and the memory die 3 (1280) may include a plane 0 (1281), a plane 1 (1285), a plane 2 (1289) and a plane 3 (1293).

The planes 1221, 1225, 1229, 1233, 1241, 1245, 1249, 1253, 1261, 1265, 1269, 1273, 1281, 1285, 1289 and 1293 included in the respective memory dies 1220, 1240, 1250 and 1280 may include a plurality of memory blocks 1222, 1226, 1230, 1234, 1242, 1246, 1250, 1254, 1262, 1266, 1270, 1274, 1282, 1286, 1290 and 1294, respectively. For example, as described with reference to FIG. 2, each of the planes may include N memory blocks Block0, Block1, . . . , BlockN−1 each including a plurality of pages, for example, $2^M$ pages. For example, blocks 1222 in plane 0 1221 of the die 0 1220 include N memory blocks Block0, Block1, . . . , BlockN−1 each including a plurality of pages, for example, $2^M$ pages.

More specifically, when a data sheet, on which the setting information on the memory device 150 (e.g., including at least one of the configuration information, organization information and addressing information of the memory device 150) are written, does not exist in the controller 130, the controller 130 may generate the commands 1202 for acquiring the missing setting information e.g., the configuration information, organization information and addressing information of the memory device 150, for example, the information on the memory dies 1220, 1240, 1260 and 1280, the planes 1221, 1225, 1229, 1233, 1241, 1245, 1249, 1253, 1261, 1265, 1269, 1273, 1281, 1285, 1289 and 1293, the memory blocks 1222, 1226, 1230, 1234, 1242, 1246, 1250, 1254, 1262, 1266, 1270, 1274, 1282, 1286, 1290 and 1294, and the $2^M$ pages. For example, the controller 130 may generate a first command for requesting setting information, for example, a command 0 (1204), a second command for requesting information on the Logical Unit Number (LUN) of the memory device 150, for example, a command 1 (1205), a third command for requesting information on the memory blocks of the memory device 150, for example, a command 2 (1208), and a fourth command for requesting information on the pages of the memory device 150, for example, a command 0 (1210).

The controller 130 may transmit the generated commands 1202 to the memory device 150 in order to request the setting information on the memory device 150 (e.g., including at least one of the configuration information, organization information and addressing information of the memory device 150), and then receive Ack signals as responses to the respective commands 1202, the Ack signals containing the setting information on the memory device 150. The controller 130 may acquire the setting information on the memory device 150 through the Ack signals received from the memory device 150, and perform a command operation in the memory device 150 corresponding to the command received from the host 102, based on the received setting information for the memory device, e.g., based on the configuration information, organization information and addressing information of the memory device 150.

Now, referring to FIG. 13, an operation of transmitting/receiving commands to process data in the memory system according to the present embodiment will be described in more detail.

FIG. 13 is a schematic illustrating the operation of transmitting/receiving a command for data processing in the memory system according to an embodiment of the present invention.

Referring to FIG. 13, since a data sheet on which the setting information on the memory device 150 (e.g., including at least one of the configuration information, organization information and addressing information of the memory device 150) are written does not exist in the controller 130, the controller 130 of the memory system 110 may generate a first command, for example, an address command and transmit the generated command to the memory device 150, in order to acquire the configuration information, organization information and addressing information of the memory device 150 (1302).

The address command is a command which the controller 130 transmits to request analysis of an address value in the memory device 150, in order to check the addressing method of the memory device 150. The memory device 150 receiving the address command may check the request for the configuration information, organization information and addressing information of the memory device 150 through the address command, and then analyze the address value in the memory device 150 so as to generate the configuration information, organization information and addressing information of the memory device 150, which will be provided to the controller 130.

The controller 130 may generate a second command for requesting the information on the logical unit number (LUN)

of the memory device 150, for example, an LUN request command 1304, and transmit the generated command to the memory device 150).

The LUN request command is a command which the controller 130 transmits to request the LUN of the memory device 150, in order to acquire the setting information on the memory device 150, for example, the information on the LUN of the memory device 150. That is, the controller 130 may transmit the LUN request command to the memory device 150, the LUN request command requesting setting information on the memory dies 1220, 1240, 1260 and 1280 or the planes 1221, 1225, 1229, 1233, 1241, 1245, 1249, 1253, 1261, 1265, 1269, 1273, 1281, 1285, 1289 and 1293, for example, the number information, organization information, configuration information and addressing information of the memory dies 1220, 1240, 1260 and 1280 or the planes 1221, 1225, 1229, 1233, 1241, 1245, 1249, 1253, 1261, 1265, 1269, 1273, 1281, 1285, 1289 and 1293, as the LUN of the memory device 150.

The memory device 150 receiving the LUN request command may transmit an Ack signal, for example, an LUN response Ack signal as a response to the LUN request command to the controller 130, the LUN response Ack signal 1306 containing the information on the LUN of the memory device 150 or the LUN of the memory device 150.

The LUN response Ack signal may include the LUN of the memory device 150 or the information on the memory dies 1220, 1240, 1260 and 1280 or the planes 1221, 1225, 1229, 1233, 1241, 1245, 1249, 1253, 1261, 1265, 1269, 1273, 1281, 1285, 1289 and 1293, which are included in the memory device 150. For example, the information may include at least one of the number information, organization information, configuration information and addressing information of the memory dies 1220, 1240, 1260 and 1280 or the planes 1221, 1225, 1229, 1233, 1241, 1245, 1249, 1253, 1261, 1265, 1269, 1273, 1281, 1285, 1289 and 1293. In response to the LUN request command.

Then, the controller 130 may generate a third command for requesting the information on the memory blocks 1222, 1226, 1230, 1234, 1242, 1246, 1250, 1254, 1262, 1266, 1270, 1274, 1282, 1286, 1290 and 1294 of the memory device 150, for example, a block request command, and then transmit the generated command to the memory device 150 (1308).

The block request command is a command which the controller 130 transmits to request a memory block value in the memory device 150, in order to acquire the setting information on the memory device 150, for example, the information on the memory blocks 1222, 1226, 1230, 1234, 1242, 1246, 1250, 1254, 1262, 1266, 1270, 1274, 1282, 1286, 1290 and 1294 included in the memory device 150. That is, the controller 130 may transmit the block request command to the memory device 150, the block request command requesting the information on the memory blocks 1222, 1226, 1230, 1234, 1242, 1246, 1250, 1254, 1262, 1266, 1270, 1274, 1282, 1286, 1290 and 1294 included in the memory device 150. For example, the information may include at least one of the number information, organization information, configuration information and addressing information of the memory blocks 1222, 1226, 1230, 1234, 1242, 1246, 1250, 1254, 1262, 1266, 1270, 1274, 1282, 1286, 1290, as the memory block value in the memory device 150.

The memory device 150 receiving the block request command may transmit an Ack signal, for example, a block response Ack signal as a response to the block request command to the controller 130, the block response Ack signal containing the information on the memory blocks 1222, 1226, 1230, 1234, 1242, 1246, 1250, 1254, 1262, 1266, 1270, 1274, 1282, 1286, 1290 and 1294 of the memory device 150 or the memory block value in the memory device 150 (1310).

The block response Ack signal may include the memory block value in the memory device 150 or the information on the memory blocks 1222, 1226, 1230, 1234, 1242, 1246, 1250, 1254, 1262, 1266, 1270, 1274, 1282, 1286, 1290 and 1294 included in the memory device 150. For example, the information may include at least one of the number information, organization information, configuration information and addressing information of the memory blocks 222, 1226, 1230, 1234, 1242, 1246, 1250, 1254, 1262, 1266, 1270, 1274, 1282, 1286, 1290 and 1294, according to the block request command.

The controller 130 may generate a fourth command for requesting the information on the $2^M$ pages of the memory device 150, for example, a page request command, and transmit the generated command to the memory device 150 (1312).

The page request command is a command which the controller 130 transmits to request a page value in the memory device 150, in order to acquire the setting information on the memory device 150, for example, the information on the plurality of pages included in the memory device 150. That is, the controller 130 may transmit the page request command to the memory device 150, the page request command requesting the information on the pages included in the memory device 150, for example, the number information, organization information, configuration information and addressing information of the pages, as the page value in the memory device 150.

The memory device 150 receiving the page request command may transmit an Ack signal, for example, a page response Ack signal as a response to the page request command to the controller 130, the page response Ack signal containing the information on the pages of the memory device 150 or the page value in the memory device 150 (1314).

The page response Ack signal may include the page value in the memory device 150 or the information on the pages included in the memory device 150, for example, the number information, organization information, configuration information and addressing information of the pages, according to the page request command.

As such, when a data sheet, on which the setting information on the memory device 150 (e.g., including at least one of the configuration information, organization information and addressing information of the memory device 150) are written does not exist in the controller 130, the memory system according to the present embodiment may transmit the commands for requesting the setting information on the memory device 150 to the memory device 150, receive the Ack signals containing the setting information on the memory device 150 as responses to the commands, and acquire the setting information on the memory device 150.

The controller 130 having acquired the setting information on the memory device 150 may check the information on the memory dies, the planes, the memory blocks and the pages which are included in the memory device 150, for example, the number information, organization information, configuration information and addressing information, and check the address value in the memory device 150 or address bits in the memory device 150. Thus, the controller 130 may normally perform a command operation corresponding to the command received from the host 102 in the memory device 150, in response to the address value in the memory device 150 or the address bits in the memory device 150. According to the present embodiments, the memory system and the operating method thereof can minimize the complexity and performance reduction of a memory system and maximize the efficiency of the memory device, thereby rapidly and stably processing data to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device comprising: a plurality of pages each having a plurality of memory cells coupled to a plurality of word lines and suitable for storing data; a plurality of memory blocks each having the pages; a plurality of planes each having the memory blocks; and a plurality of memory dies each having the planes, and
a controller suitable for transmitting a first request command for acquiring first setting information on the memory device to the memory device, receiving a first acknowledgement signal corresponding to the first request command from the memory device, and checking the first setting information included in the first acknowledgement signal, transmitting a second request command for acquiring missing second setting information for the memory device to the memory device when the first setting information included in the first acknowledgement signal is not fulfilled, wherein the first setting information obtained by the first request command and the second setting information obtained by the second request command correspond to different structural components of the memory device respectfully,
wherein the setting information comprises addressing information and one or more of number information, organization information, and configuration information, on the memory dies or the planes or the memory blocks or the pages, and
wherein the structural component of the memory device includes at least one of the plurality of the memory dies, the plurality of planes, the plurality of memory blocks and the plurality of pages in the memory device.

2. The memory system of claim 1, wherein the controller suitable for receiving a second acknowledgement signal corresponding to the second request command from the memory device, includes checking the missing setting information included in the second acknowledgement signal to perform a command operation based on a command received from a host on the memory device.

3. The memory system for claim 1, wherein the missing setting information indicates at least one or more of number information, organization information, configuration information and addressing information for the memory dies or the planes or the memory blocks or the pages that is not included in the setting information.

4. The memory system for claim 1, wherein the first request command or the second request command is one of a first command for requesting analysis of an address value in the memory device in order to check the addressing method of the memory device, a second command for requesting information on a Logical Unit Number of the memory device, a third command for requesting information on the memory blocks of the memory device, and a fourth command for requesting information on the pages of the memory device.

5. An operating method of a memory system, comprising:
checking setting information on a memory device, wherein the memory device comprises a plurality of pages each having a plurality of memory cells coupled to a plurality of word lines and suitable for storing data, a plurality of memory blocks each having the pages, a plurality of planes each having the memory blocks, and a plurality of memory dies each having the planes;
generating a first request command for acquiring the first setting information to transmit the request command to the memory device;
receiving an first acknowledgement signal corresponding to the first request command from the memory device; and
checking the first setting information included in the first acknowledgement signal, transmitting a second request command for acquiring missing second setting information for the memory device to the memory device when the first setting information included in the first acknowledgement signal is not fulfilled,
wherein the first setting information obtained by the first request command and the second setting information obtained by the second request command correspond to different structural components of the memory device respectfully,
wherein the setting information comprises addressing information and one or more of number information, organization information, and configuration information, on the memory dies or the planes or the memory blocks or the pages, and
wherein the structure component of the memory device includes at least one of the plurality of memory dies, the plurality of planes, the plurality of memory blocks and the plurality of pages in the memory device.

6. The operating method of claim 5, further comprising:
receiving a second acknowledgement signal corresponding to the second request command from memory device,
checking the missing setting information included in the second acknowledgement signal to perform a command operation based on a command received from a host on the memory device.

7. The operating method of claim 5, wherein the missing setting information indicates at least one or more of number information, organization information, configuration information and addressing information on the memory dies or the planes or the memory blocks or the pages that is not included in the setting information.

8. The operating method of claim 5, wherein the first request command or the second request command is one of a first command for requesting analysis of an address value in the memory device in order to check the addressing method of the memory device, a second command for requesting information on a Logical Unit Number of the memory device, a third command for requesting information on the memory blocks for the memory device, and a fourth command for requesting information on the pages of the memory device.

* * * * *